Figure 3:
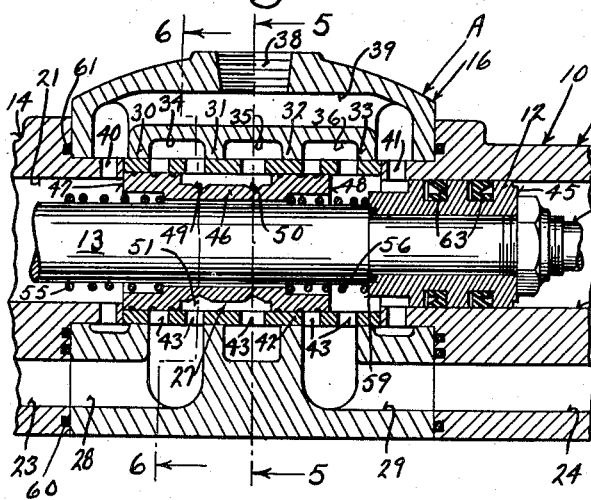

March 4, 1958  A. W. LIPPMANN  2,825,310
HYDRAULIC RAM AND VALVE
Filed May 17, 1956  2 Sheets-Sheet 1
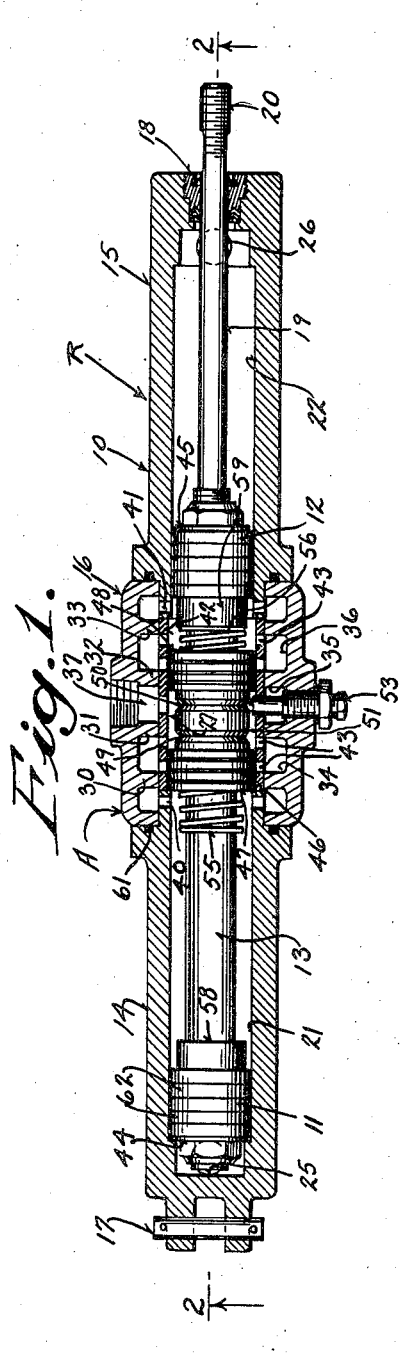
INVENTOR
ARTHUR W. LIPPMANN
BY
*Moving and Wright*
ATTORNEYS March 4, 1958 A. W. LIPPMANN 2,825,310
HYDRAULIC RAM AND VALVE
Filed May 17, 1956 2 Sheets-Sheet 2

INVENTOR
ARTHUR W. LIPPMANN

BY *Young and Wright*

ATTORNEYS

United States Patent Office 2,825,310
Patented Mar. 4, 1958

2,825,310

HYDRAULIC RAM AND VALVE

Arthur W. Lippmann, Milwaukee, Wis., assignor to Lippmann Engineering Works, Milwaukee, Wis., a partnership Application May 17, 1956, Serial No. 585,484

2 Claims. (Cl. 121—164)

My invention appertains to hydraulic mechanisms and more particularly to a novel single unit hydraulic ram and valve assembly.

Hertofore, in hydraulic rams of the reciprocating piston type, difficulty has been experienced both in the manufacturing and positioning of the valve mechanism for directing the flow of fluid alternately to the different ends of the hydraulic pistons. Usually, the valve has been located outside of the ram casing and some means provided to operate the valve to reverse the flow in timed relation with the extreme end movement of the pistons. To my knowledge, no attempt has ever been made to provide a sleeve valve built into the ram casing to operate automatically as each piston moves to one extreme end of its stroke, and no positive means has been incorporated to hold the sleeve valve in one position until the piston has reached the end of its stroke and then to release the valve whereby it will move to its alternate position. In fact, in the past, the valve has often stopped at dead center causing a balance in the flow of the hydraulic fluid and a resulting stoppage of the device. Further, to my knowledge, no positive means has been provided to insure the complete movement of the sleeve valve from one alternate position to the other.

Therefore, a primary object of my present invention is to provide a hydraulic ram having a longitudinal casing and a cylinder in the casing with the pistons and sliding valve positioned in the cylinder and the valve being actuated by movement of the piston.

A salient feature of my present invention is to provide novel positive means for insuring complete movement of the sleeve valve from one position to the other during the reciprocation of the pistons.

Another important object of my present invention is to provide a positive means to hold the sleeve valve in one of its alternate positions until the respective piston approaches the limit of its stroke.

A further object of my present invention is to provide means whereby sufficient force will be exerted on the sleeve valve to cause its release and movement to its other alternate position as the respective piston reaches one extreme of its stroke.

A more specific object of my invention is to provide a sleeve valve which is cushioned by spring means on each end in such a manner that the spring contacts a respective piston just prior to the end of its stroke to urge the sleeve valve to its alternate position and thereby reversing the flow of hydraulic fluid.

A still further object of my present invention is to provide a hydraulic ram and valve assembly which is simple in construction, reliable in its operation and not liable to get out of order.

With these and other objects in view which will more readily appear as the nature of the invention is better understood, the same consists in the novel construction, combination and arrangement of parts hereinafter more fully described, illustrated and claimed.

A preferred and practical embodiment of my present invention is shown in the accompanying drawings, in which:

Figure 1 is a longitudinal sectional view through my hydraulic ram and valve assembly showing, in particular, the inlet side of the ram, Figure 2 is a longitudinal sectional view taken at right angles to Figure 1 of the drawings and illustrating, in particular, the outlet side of the ram, the section being taken on the line 2—2 of Figure 1 and looking in the direction of the arrows.

Figure 5:
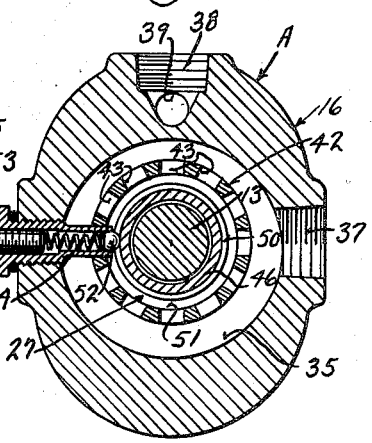
Figure 4:
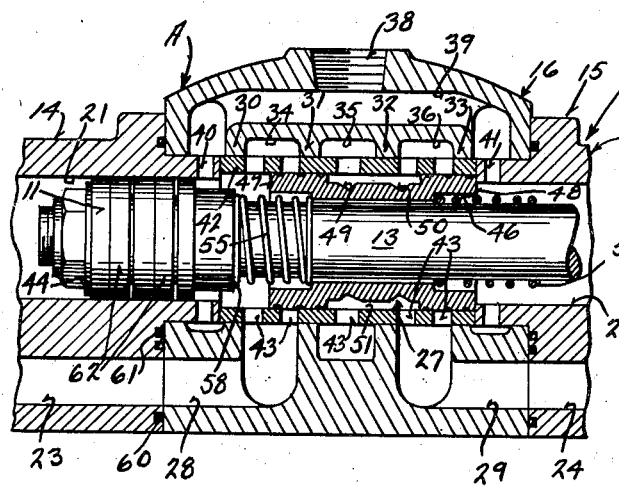
Figure 6:
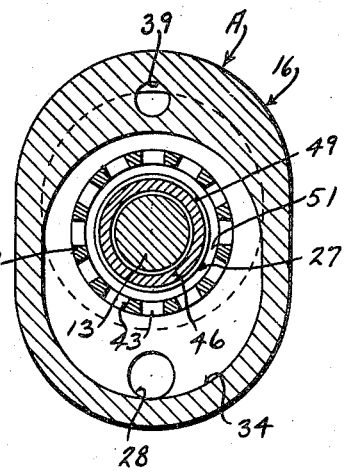

Figure 3 is a fragmentary enlarged longitudinal section similar to Figure 2 of the drawings showing the outlet side of the ram with the sleeve valve and one piston being shown in one extreme end of travel, Figure 4 is a fragmentary longitudinal sectional view similar to Figure 3 of the drawings, but showing the sleeve valve in its other extreme end of travel and the other piston in its alternate position, Figure 5 is a transverse sectional view through the hydraulic ram and valve assembly, the view being taken on the line 5—5 of Figure 3 of the drawings and looking in the direction of the arrows, and Figure 6 is a transverse sectional view through my novel hydraulic ram and valve assembly, the section being represented by the line 6—6 of Figure 3 and looking in the direction of the arrows.

Referring now to the drawings in detail wherein similar reference characters designate corresponding parts throughout the several views, the letter R generally indicates a hydraulic ram which includes broadly, an elongated casing 10, a pair of reciprocating hydraulic pistons 11 and 12, a piston rod 13 joining the pistons and a novel valve assembly A. The casing 10 may be formed in any desired manner but is preferably cast in three main sections, the end sections 14 and 15 and a center section 16. The end section 14 is adapted to be anchored to a suitable support and for this purpose a pin 17, or the like is provided and the end section 15 is bored to receive a fitting and suitable seals 18 through which extend a reciprocating drive rod or shaft 19. The drive rod or shaft 19 is, in turn, secured to the piston 12 and its outer end 20 may be externally threaded and slotted to adapt the same to attachment with any mechanism to which it is desired to impart motive power thereto.

Internally, the end sections 14 and 15 are similarly constructed and they include enlarged, smooth longitudinally extending cylinders or bores 21 and 22, respectively, and it is within the bores 21 and 22 that the pistons 11 and 12 are adapted to reciprocate. I also provide channels 23 and 24, respectively, and each channel runs parallel with its respective bore and communicates therewith at its extreme outer end through suitable ports 25 and 26, respectively.

The center section 16 includes a relatively large central chamber 27 communicating with and in longitudinal alignment with the inner end of the bores. The section 16 also carries a pair of ports 28 and 29 and these ports, in turn, communicate with the central chamber 27 and the channels 23 and 24, respectively, of the end sections. This center section 16 also includes a series of inner peripheral walls 30, 31, 32 and 33 about the central chamber and these walls form separate peripheral chambers 34, 35 and 36 which are in open communication with the central chamber 27. It is to be noted that I provide an inlet port 37 (Figures 1 and 5) which communicates directly with the peripheral chamber 35 and an outlet port 38 (Figures 3 and 5) which communicates with a longitudinally extending passageway 39 (Figures 3, 5 and 6) and this passageway 39 communicates with the inner ends of the enlarged bores 21 and 22 and the end terminations of the central chamber 27 through the openings 40 and 41, respectively.

Within the central chamber 27 is a sleeve 42 having a series of perforations 43 about its outer periphery which, under ordinary circumstances, provides open communication between the central chamber 27, peripheral chambers 34, 35 and 36 and the end ports 40 and 41. With the ram assembled, as shown, the bores 21, 22 and central chamber 27 within the sleeve 42 form a single and continuous cylinder, except that the inner diameter of the sleeve 42 is slightly larger than the inner diameter of the bores.

In order to direct the flow of fluid from one chamber to the other and alternately against the respective ends 44, 45 of the pistons 11 and 12, I provide a novel sliding sleeve valve 46 and this valve fits over and is spaced from the piston rod 13 so that sliding movement of the piston rod 13 per se imparts no motion or movement to the sleeve valve 46. The respective end portions 47 and 48 of the valve fit snugly within the sleeve 42 and the central portion of this valve is reduced and is further provided with a pair of spaced parallel grooves 49 and 50. This reduced portion of the valve 46 provides a restricted space or chamber 51 within the central chamber 27.

The spaced parallel grooves 49 and 50 are adapted to alternately receive a spring pressed ball 52 as shown clearly in Figure 5 of the drawings. The force or pressure that the ball 52 exerts is regulated by means of an adjusting nut 53 and spring 54. Thus, the ball serves the purpose of positively positioning and holding the valve 46 in each alternative position (Figures 3 and 4) and maintains said valve in one alternate position against movement until the respective piston exerts sufficient force to move the valve which actions overcome the spring pressure and the ball rides out of the groove. The spaced parallel grooves 49, 50 and the ball 52 could, of course, be positioned on one end of the valve 46 and if desired, the said end of the valve could be extended for this purpose.

For the purpose of moving the valve 46 from one position (Figure 3) to the other position (Figure 4) and also to cushion the force with which the respective piston strikes against the valve, I provide a pair of coil springs 55 and 56 or the like and the respective ends 47 and 48 of the valve 46 are countersunk to receive one end of a respective spring. The outer end of the coil springs abut the inner end portions 58 and 59 of each piston.

Obviously, in order to avoid leakage of the hydraulic fluid, suitable seals, such as the O-rings 60 and 61 are provided. Further, each piston is provided with a pair of oil seals 62 and 63 respectively.

Now, in order to reciprocate the pistons 11 and 12 and to move the drive shaft 19, hydraulic fluid under pressure enters the inlet port 37 and is directed by proper positioning of the valve 46 to one end 44 or 45 of a respective piston 11 and 12, thus, forcing the piston to slide in its bore 21 or 22. With the valve in the position illustrated in Figures 1, 2 and 3 of the drawings, the flow of hydraulic fluid is as follows: from inlet port 37 to peripheral chamber 35, restricted chamber 51 of central chamber 27, peripheral chamber 34, port 28, passageway 23 to the end 44 of piston 11. This flow of hydraulic fluid exerts pressure on the end 44 of the piston and starts its movement toward the opposite end of the bore 21. Fluid in the bore 22 is moved outwardly through passageway 24, bore 29, central chamber 36, opening 41, channel 39 and out the exhaust port 38. Fluid in bore 21 on the opposite end 58 of piston 11 is free to move out of opening 40 to channel or passageway 39 and out of the ram through outlet port 38. Continued movement of the piston 11 toward the central chamber 27 causes this piston to compress the spring 55 and overcomes the pressure of the ball 52 which is now seated in groove 50. This causes the valve 46 to slide within the sleeve 31 to the position illustrated in Figure 4 of the drawings wherein the ball 52 will enter the groove 49 and hold the valve in that position.

Flow of hydraulic fluid is then reversed and the fluid entering the inlet port 37 enters the peripheral chamber 35, restricted chamber 51, peripheral chamber 36, port 29, passageway 24 and exerts pressure against the end 45 of piston 12 and starts piston 12 in its movement towards position illustrated in Figure 3 of the drawings. The valve 46, of course, is held against movement and holds the position illustrated in Figure 4 and the fluid is exhausted from bore 21 through passageway 23, port 28, peripheral chamber 34, opening 40, passageway 39 and out the exhaust port 38. Continued movement of piston 12 will compress spring 56 and the valve 46 is again moved to its position illustrated in Figures 1 to 3 inclusive and the cycle is repeated as previously described. Of course, fluid in bore 22 on the opposite side 59 of piston 12 is free to move out opening 41, channel 39 and outlet port 38.

Great stress is laid in the fact that the sliding sleeve valve 46 is positively held in each alternate position until the respective piston approaches the extreme end of its stroke and that the movement of the valve is cushioned by means of the coil springs 55 and 56 until sufficient force is exerted to move the ball out of its groove and the valve is positively moved to its alternate position and the ball enters the other groove to hold the valve in that position.

While I have shown the hydraulic ram as being of the double piston type, it is to be understood that the principles of my invention can be incorporated in a ram embodying a single reciprocating piston. Also, the valve arrangement could be located outside of the casing and the valve actuated by some means projecting into the cylinder.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. In a hydraulic ram, a longitudinally extending casing having an enlarged elongated bore therein extending longitudinally therewith, a pair of spaced pistons adapted to reciprocate in said bore, a rod securing the inner ends of each piston, said rod being substantially shorter in longitudinal length than the length of said bore, said casing having an enlarged central chamber in open communication with said bore and in longitudinal alignment therewith, said pistons being positioned on opposite sides of said central chamber, peripheral inner walls in said central chamber forming a series of peripheral chambers surrounding said central chamber, a longitudinally extending sleeve in said central chambers separating said peripheral chambers from said central chamber, said sleeve being provided with a series of perforations affording communication between said peripheral chambers and said central chamber, a sliding valve received in said sleeve, an inlet port in said casing communicating directly with said central chamber, an outlet port in said casing communicating with the extreme end terminations of said central chamber and said respective portions of said bore, a passageway connecting each end peripheral chamber with a respective outer end of said bore, said valve adapted to move alternately to one position to open communication between said inlet port and one of said passageways and to close communication between said inlet port and said other passageway and to another position to close communication between said first mentioned passageway and said inlet port and to open communication between said inlet port and said second mentioned passageway, said valve also adapted to open communication alternately between said opposite respective end of said bore and said outlet port, and means for holding said valve in a respective position until movement of a respective piston urges said valve to its other alternate position.

2. In a hydraulic ram, a longitudinally extending casing having an enlarged elongated bore therein extending longitudinally therewith, a pair of spaced pistons adapted to reciprocate in said bore, a rod securing the inner ends of each piston, said rod being substantially shorter in longitudinal length than the length of said bore, said casing having an enlarged central chamber in open communication with said bore and in longitudinal alignment therewith, peripheral inner walls in said central chamber forming a series of peripheral chambers surrounding said central chamber, a longitudinally extending sleeve in said central chamber separating said peripheral chambers from said central chamber, said sleeve being provided with a series of perforations affording communication between said peripheral chambers and said central chamber, a sliding valve received in said sleeve, said pistons being positioned on opposite sides of said central chamber and adapted to alternately contact the respective end of said valve, an inlet port in said casing communicating directly with said central chamber, an outlet port in said casing communicating with the extreme end terminations of said central chamber and said respective portions of said bore, a passageway connecting each end peripheral chamber with a respective outer end of said bore, said valve adapted to move alternately to one position to open communication between said inlet port and one of said passageways and to close communication between said inlet port and said other passageway and to another position to close communication between said first mentioned passageway and said inlet port and to open communication between said inlet port and said second mentioned passageway, said valve also adapted to open communication alternately between said opposite respective end of said bore and said outlet port, means for holding said valve in a respective position until movement of a respective piston urges said valve to its other alternate position, and means for cushioning the force of each piston as it contacts the respective end of said valve.

References Cited in the file of this patent

UNITED STATES PATENTS

| | | |
|---|---|---|
| 2,387,733 | Balton | Oct. 30, 1945 |
| 2,555,018 | Von Seggern | May 29, 1951 |
| 2,699,153 | Russell | Jan. 11, 1955 |
| 2,749,886 | Densmore | June 12, 1956 |
| 2,751,891 | Mohler | June 26, 1956 |
| 2,803,195 | Lock | Aug. 20, 1957 |